(12) United States Patent
Vlasak

(10) Patent No.: US 12,601,419 B2
(45) Date of Patent: Apr. 14, 2026

(54) REMOVABLE VALVE PLUG ASSEMBLY

(71) Applicant: USSI, LLC, Venice, FL (US)

(72) Inventor: Dion Vlasak, Venice, FL (US)

(73) Assignee: USSI, LLC, Venice, FL (US)

( * ) Notice: Subject to any disclaimer, the term of this patent is extended or adjusted under 35 U.S.C. 154(b) by 3 days.

(21) Appl. No.: 18/420,216

(22) Filed: Jan. 23, 2024

(65) Prior Publication Data

US 2025/0172216 A1 May 29, 2025

Related U.S. Application Data

(60) Provisional application No. 63/603,939, filed on Nov. 29, 2023.

(51) Int. Cl.
| | |
|---|---|
| *F16K 27/12* | (2006.01) |
| *F16K 27/00* | (2006.01) |
| *E03B 9/10* | (2006.01) |

(52) U.S. Cl.
CPC ................ *F16K 27/12* (2013.01); *E03B 9/10* (2013.01); *F16K 27/006* (2013.01); *Y10T 137/7021* (2015.04)

(58) Field of Classification Search
CPC .......... E03B 9/10; F16K 27/12; F16K 31/508; F16K 27/006; F16L 55/11; F16L 55/124; F16L 55/1283; F16L 55/13; F16L 55/132; F16L 55/136; Y10T 137/7021
USPC ....... 137/363–372; 251/264; 138/89, 90, 91, 138/92, 94, 96 R; 220/233, 234, 235, 220/236, 237, 238, 327
See application file for complete search history.

(56) References Cited

U.S. PATENT DOCUMENTS

| | | | | |
|---|---|---|---|---|
| 1,004,436 A | * | 9/1911 | Kehr, Sr. ................... | E03B 9/10 137/370 |
| 1,239,225 A | * | 9/1917 | Sampson ............... | B65D 39/12 215/360 |
| 1,558,161 A | * | 10/1925 | Gunderson ............. | E03C 1/306 4/255.06 |

(Continued)

FOREIGN PATENT DOCUMENTS

WO            2023152494 A1     8/2023

OTHER PUBLICATIONS https://gatestrainer.com/how-it-works, 2 pages (2024).
(Continued)

*Primary Examiner* — Kenneth Rinehart
*Assistant Examiner* — Jonathan J Waddy
(74) *Attorney, Agent, or Firm* — Dinsmore & Shohl LLP

(57)                    ABSTRACT

Embodiments disclosed herein are directed to a removable plug assembly configured to inhibit debris from passing through is provided. The removable plug assembly includes a support member portion and a plug portion. The support member portion has a plurality of support members extending outward from a center portion. The plug portion has a continuous wall sloping in an inwardly central axis direction from a top surface to a bottom surface. The top surface defining a perimeter of the of the plug portion. The support member portion coupled to the top surface. Each one of the plurality of support members extend beyond the perimeter. The continuous wall operable to contact a portion of an inner surface of a tube to inhibit the plug portion from advancing fully into the tube.

20 Claims, 6 Drawing Sheets

(56) References Cited

U.S. PATENT DOCUMENTS

| | | | | | |
|---|---|---|---|---|---|
| 2,033,880 | A | * | 3/1936 | Coles | A01G 25/00 |
| | | | | | 137/364 |
| 2,366,975 | A | | 1/1945 | McChesney | |
| 2,444,779 | A | * | 7/1948 | Krasberg | B65D 45/322 |
| | | | | | 220/233 |
| 2,566,816 | A | * | 9/1951 | Work | F16L 55/132 |
| | | | | | 220/210 |
| 3,291,156 | A | * | 12/1966 | Corsano | F16L 55/132 |
| | | | | | 277/910 |
| 3,365,093 | A | * | 1/1968 | Malenke | F16J 13/02 |
| | | | | | 411/368 |
| 3,494,504 | A | | 2/1970 | Jackson | |
| 3,618,809 | A | * | 11/1971 | Martino | B65D 39/12 |
| | | | | | 220/235 |
| 3,667,640 | A | * | 6/1972 | Morrow | F16L 55/132 |
| | | | | | 220/235 |
| 3,797,286 | A | * | 3/1974 | Saporito | F16K 35/10 |
| | | | | | 137/364 |
| 4,303,101 | A | | 12/1981 | Tholen | |
| 5,035,265 | A | * | 7/1991 | Chen | F16L 55/132 |
| | | | | | 138/89 |
| 5,044,403 | A | * | 9/1991 | Chen | F16L 55/132 |
| | | | | | 220/236 |
| D326,408 | S | * | 5/1992 | Smith | D8/499 |
| 5,209,257 | A | | 5/1993 | Baker, Jr. | |
| 5,403,116 | A | * | 4/1995 | Brewer | E01F 9/677 |
| | | | | | 404/25 |
| 5,439,130 | A | * | 8/1995 | Waugh | F16L 55/11 |
| | | | | | 70/164 |
| 5,871,030 | A | * | 2/1999 | Agbay | F16K 35/06 |
| | | | | | 137/364 |
| 6,161,984 | A | | 12/2000 | Sinclair | |
| 6,250,337 | B1 | | 6/2001 | Bevacco | |
| 6,662,490 | B1 | * | 12/2003 | Aesch, Jr. | F16L 55/132 |
| | | | | | 43/132.1 |
| 6,886,592 | B1 | | 5/2005 | Hart, Jr. | |
| 7,013,500 | B1 | | 3/2006 | Lin | |
| 7,163,635 | B2 | | 1/2007 | Fitzgerald | |
| 7,644,734 | B2 | | 1/2010 | Palmer | |
| 8,025,079 | B2 | | 9/2011 | Wander | |
| 8,763,170 | B1 | | 7/2014 | Ungarsohn | |
| 9,982,418 | B2 | | 5/2018 | Bennett | |
| 11,391,027 | B1 | | 7/2022 | Ali | |
| D972,090 | S | | 12/2022 | Liu | |
| D1,014,709 | S | | 2/2024 | Xiang | |
| D1,021,013 | S | | 4/2024 | Wu | |
| D1,032,796 | S | | 6/2024 | Chen | |
| D1,032,798 | S | | 6/2024 | Chen | |
| D1,053,318 | S | | 12/2024 | Tang | |
| D1,058,764 | S | | 1/2025 | Wu | |
| D1,068,037 | S | | 3/2025 | Chen | |
| 2003/0037818 | A1 | * | 2/2003 | Helle | G01F 15/10 |
| | | | | | 137/364 |
| 2005/0103694 | A1 | | 5/2005 | Rost et al. | |
| 2006/0260688 | A1 | * | 11/2006 | Green | E03B 9/10 |
| | | | | | 137/371 |
| 2007/0006928 | A1 | * | 1/2007 | Meserlian | E04H 4/12 |
| | | | | | 138/89 |
| 2008/0023077 | A1 | * | 1/2008 | Weisz | F16K 31/46 |
| | | | | | 137/365 |
| 2009/0211766 | A1 | * | 8/2009 | Cuthill | E21B 33/02 |
| | | | | | 166/85.1 |
| 2013/0129418 | A1 | | 5/2013 | Wander | |
| 2014/0053327 | A1 | | 2/2014 | Lee | |
| 2014/0053328 | A1 | | 2/2014 | Chen | |
| 2021/0270022 | A1 | | 9/2021 | Dowling | |
| 2024/0328526 | A1 | * | 10/2024 | Barnowski | F16K 27/12 |
| 2025/0067366 | A1 | * | 2/2025 | Hart | F16K 27/12 |

OTHER PUBLICATIONS

Cleanout Replacement Plug to MyTana (https://mytana.com/product/cleanout-replacement-plug/), dated Nov. 13, 2023, 7 pages.

Cleanout Style Plug to Peterson Products (https://www.petersenproducts.com/plug-mech-hand-tight-cleanout-style-405-to-4315-dia), dated Nov. 13, 2024, 4 pages.

Debris Cap for Water Valve Boxes (Stock) (https://utility-technologies.myshopify.com/products/debris-cap-for-water-or-gas-valve-boxes-stock), dated Nov. 13, 2023, 10 pages.

* cited by examiner

REMOVABLE VALVE PLUG ASSEMBLY

CROSS-REFERENCE TO RELATED APPLICATIONS

This application claims priority of U.S. Provisional Patent Application Ser. No. 63/603,939 filed Nov. 29, 2023, entitled "Removable Valve Plug Assembly" which is incorporated herein by reference.

TECHNICAL FIELD

The present disclosure relates generally to a valve box assemblies, and more specifically, to valve plugs for use with valve box assemblies.

BACKGROUND

Conventional valve boxes include various piping and a valve. Generally, the piping includes a joint that fluidly connects an upper pipe with access that is covered by a lid and a lower pipe positioned below a finished grade and that connects to an operational nut of the valve. Valve boxes are susceptible to sand, dirt, and other foreign debris entering into the lower pipe inhibiting access to the operational nut of the valve.

SUMMARY

In one embodiment, a valve box assembly is provided. The valve box assembly includes a first tube and a second tube. A terminating end of the second tube is received within an inner diameter of the first tube to create a lip within the first tube. A valve assembly is positioned below the second tube in a vertical direction. The valve assembly has an operational nut positioned within the second tube. The valve box assembly includes a removable plug that has a support member portion and a plug portion. The support member portion has a plurality of support members extending outward from a center portion. The plug portion has a continuous wall sloping in an inwardly central axis direction from a top surface to a bottom surface. The top surface defining a perimeter of the of the plug portion. The support member portion coupled to the top surface. Each one of the plurality of support members extend beyond the perimeter. The continuous wall is operable to contact a portion of an inner surface of the second tube to inhibit the removable plug from advancing fully into the second tube.

In another embodiment, a valve box assembly is provided. The valve box assembly includes a first tube that has an inner diameter, a second tube that has a terminating end portion that is received within the inner diameter of the first tube to create a lip within the first tube, a valve assembly positioned below the second tube in a vertical direction, and a removable plug. The valve assembly has an operational nut positioned within the second tube. The removable plug includes a support member portion and a plug portion. The support member portion has a plurality of support members extending outward from a center portion. The plug portion has a continuous wall tapered in an inwardly central axis direction from a top surface to a bottom surface. The top surface defining a perimeter of the of the plug portion. The support member portion is coupled to the top surface. Each one of the plurality of support members extend beyond the perimeter. The continuous wall is operable to contact a portion of an inner surface of the second tube to inhibit the removable plug from advancing fully into the second tube.

The plug portion is operable to frictionally secure the plug portion to the second tube between the top surface and the bottom surface.

In yet another embodiment, a removable plug assembly configured to inhibit debris from passing through is provided. The removable plug assembly includes a support member portion and a plug portion. The support member portion has a plurality of support members extending outward from a center portion. The plug portion has a continuous wall sloping in an inwardly central axis direction from a top surface to a bottom surface. The top surface defining a perimeter of the of the plug portion. The support member portion coupled to the top surface. Each one of the plurality of support members extend beyond the perimeter. The continuous wall operable to contact a portion of an inner surface of a 7 to inhibit the plug portion from advancing fully into the tube.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a removable valve plug assembly for use within a valve box assembly to prevent sand, dirt, and other debris from entering an undesirable section or portion of the valve box assembly, such as from entering a tube that is covering an operation nut. Sand, dirt, and other debris inhibits the ability of a valve operably connected to the operation nut to be operated properly, in a desirable manner, and in some cases, may prevent quick access to the operation nut and/or valve for turn-off. The removable valve plug assembly described herein includes no mechanical pieces on the plug assembly which would cause the plug to fail due to moisture, sand, other debris, or Ultra Violet light. Further, the removable plug assembly is not affected by weather and is formed from a corrosion resistant material.

The removable plug assembly includes a plug portion formed of one material and a support member portion formed of a second material. The support member portion is configured to prevent the plug portion from falling through or passing a desirable point or portion of the tube that covers, protects, or housing the operation nut and/or the valve. The support member portion extends from an upper surface of the plug portion in a lateral and/or longitudinal direction beyond an outermost diameter or perimeter of the upper surface of the plug portion. As such, portions of the support member portion may be configured to engage with an inner surface of the tube to prevent or inhibit the plug portion from moving or advancing beyond the desired location The removable plug assembly is gravity fed and uses the slidable contact or engagement between the plug portion and the inner surface of the tube to prevent debris from passing beyond the plug portion. That is, the plug portion may use friction to rigidly engage with the inner surface of the tube and the support member portion rigidly engages with the inner diameter of the tube. As such, the support member portion prevents the removable plug assembly from falling through the tube. That is, overtime, the material of the plug portion may degrade or wear causing the removable plug assembly to fall into undesirable locations within the tube. The support member portion inhibits or prevents the removable plug assembly from slipping though the tube.

Figures 1, 3A, 3B:
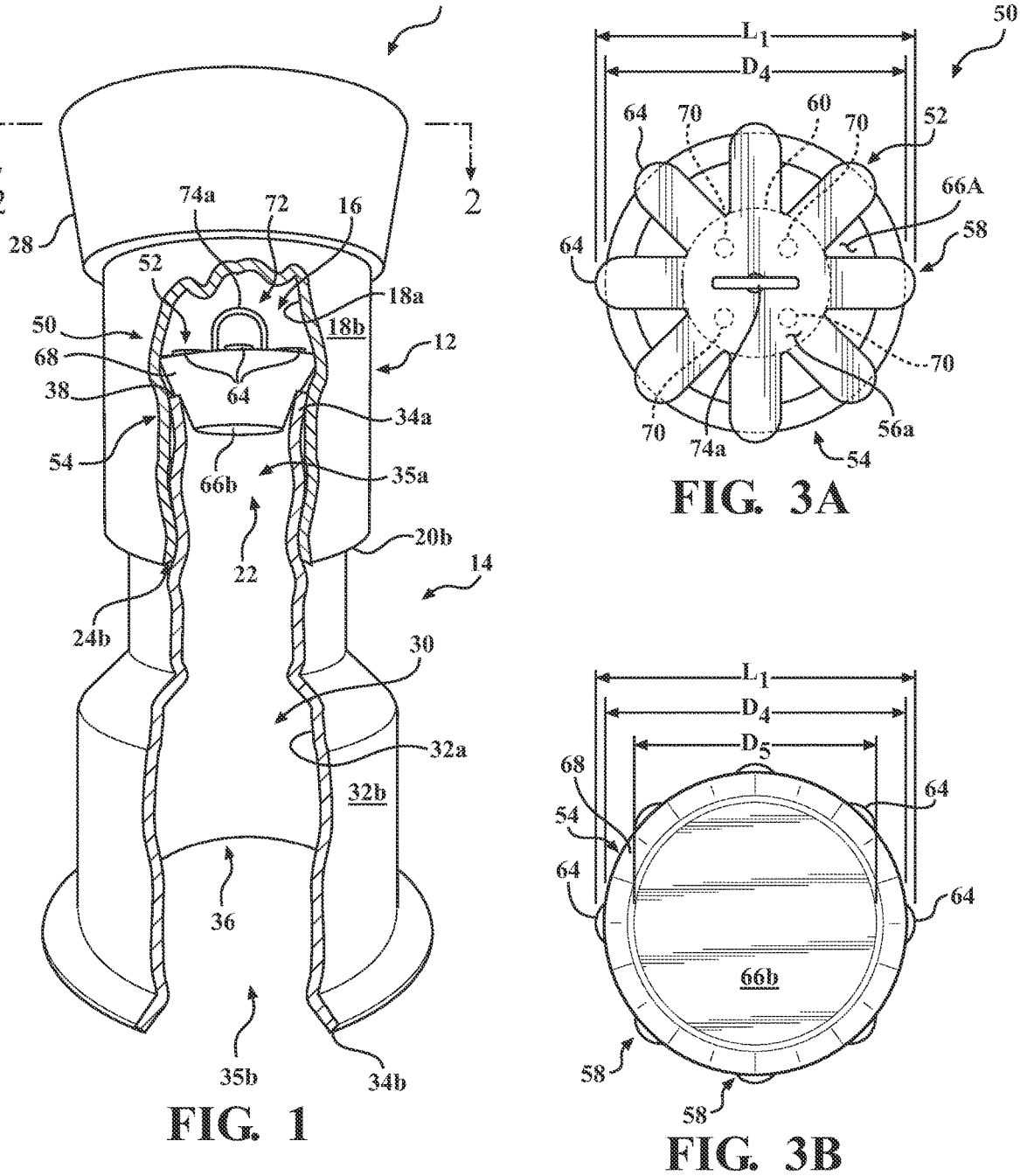
FIG. 1 schematically depicts an example valve box assembly, according to one or more embodiments shown or described herein.
FIG. 3A schematically depicts an isolated top-down view of a removable valve plug assembly from the example valve box assembly of FIG. 1, according to one or more embodiments shown or described herein.
FIG. 3B schematically depicts an isolated bottom view of a removable valve plug assembly from the example valve box assembly of FIG. 1, according to one or more embodiments shown or described herein.

As used herein, the term "longitudinal direction" refers to the forward-rearward direction of the valve box assembly (i.e., in the +/−X direction depicted in FIG. 1). The term "lateral direction" refers to the cross-valve box assembly direction (i.e., in the +/−Y direction depicted in FIG. 1), and is transverse to the longitudinal direction. The term "vertical direction" refers to the upward-downward direction of the valve box assembly (i.e., in the +/−Z-direction depicted in FIG. 1). As used herein, "below" and "downwardly" are defined as the negative Z direction of the coordinate axis shown in the drawings.

Figure 2:
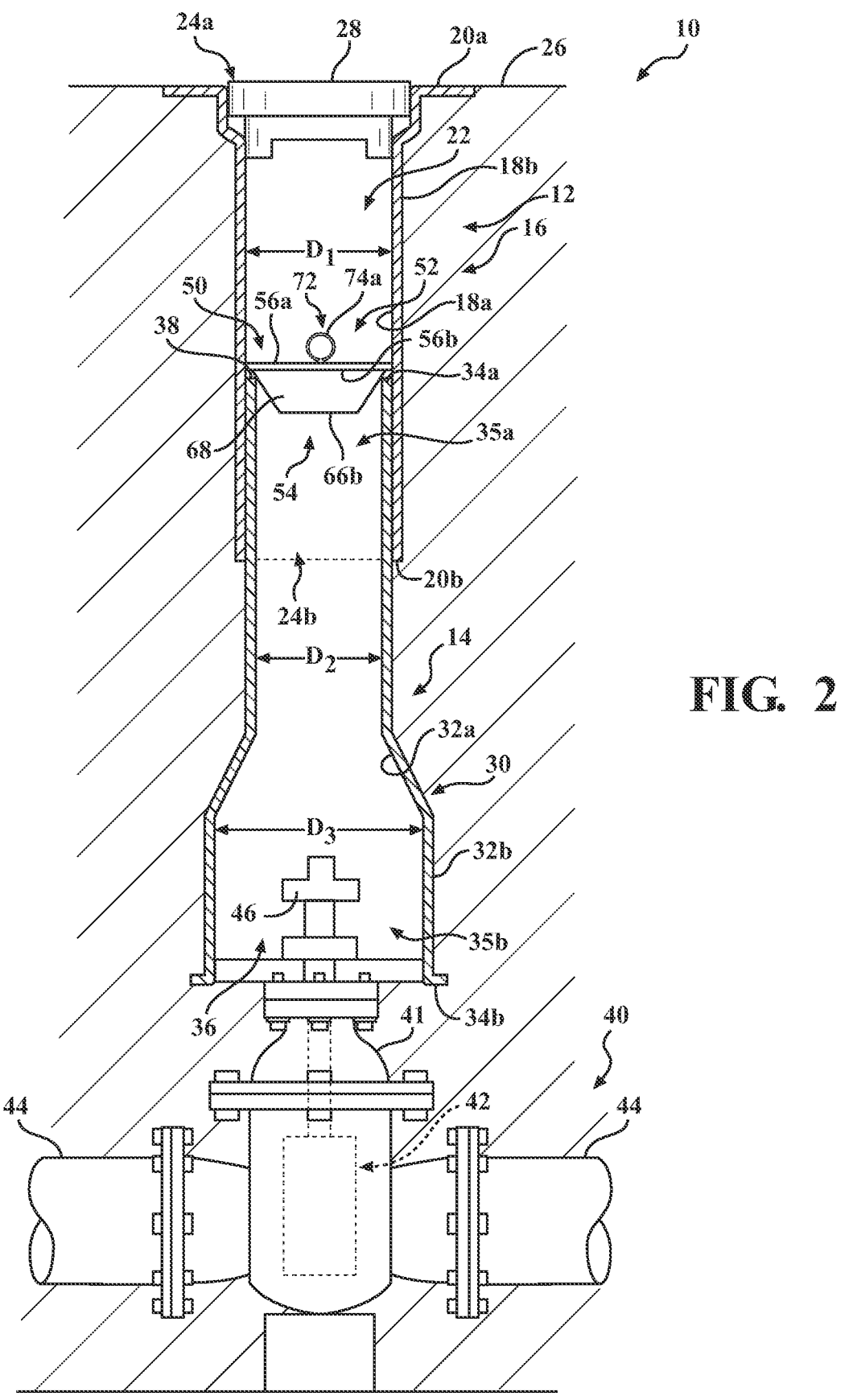
FIG. 2 schematically depicts a cross-sectional view of the example valve box assembly of FIG. 1 taken from line 2-2, according to one or more embodiments shown or described herein.

Now referring to FIGS. 1-2, an example valve box assembly 10 is schematically depicted. The valve box assembly includes an upper tube 12 and a lower tube 14. The upper tube 12 may include a continuous wall 16 that has an interior surface 18a and an opposite exterior surface 18b. The continuous wall 16 may be cylindrical in shape and include an upper tube first terminating end 20a and an opposite upper tube second terminating end 20b. An upper tube bore 22 extends between an upper opening 24a and an opposite lower opening 24b such that the upper tube bore 22 extends a length of the upper tube 12. The upper tube 12 has an upper tube diameter D1 defined by the interior surface 18a of the continuous wall 16. Therefore, in some embodiments, the upper tube 12 may be a cylindrical pipe or other relatively high length:width aspect ratio long hollow structures that afford liquids and/or gases to pass therethrough.

The upper tube first terminating end 20a and the upper opening 24a may be positioned at a ground level 26 or just below the ground level 26 in the vertical direction (i.e., in the +/−Z direction). The upper tube first terminating end 20a may be configured to receive a cover 28 that covers the upper opening 24a. The cover 28, when removed, provides access to the upper opening 24a along with the upper tube 12 and the lower tube 14.

The lower tube 14 may include a continuous wall 30 that has an interior surface 32a and an opposite exterior surface 32b. The continuous wall 30 may be cylindrical in shape and include a connector terminating end 34a and an opposite valve terminating end 34b. A lower tube bore 36 extends between a connector tube opening 35a and a valve tube opening 35b such that the lower tube bore 36 extends a length of the lower tube 14 between the connector terminating end 34a and the valve terminating end 34b. The lower tube 14 has a lower tube diameter D2 defined by the interior surface 32a of the continuous wall 30. Therefore, in some embodiments, the lower tube 14 may be a cylindrical pipe or other relatively high length:width aspect ratio long hollow structures that afford liquids and/or gases to pass therethrough. The lower tube diameter D2 at the connector terminating end 34a is less than, or smaller than, the upper tube diameter D1. As such, portions of the lower tube 14 may be received within the upper tube 12. In some embodiments, a lower tube valve end diameter D3 of the lower tube 14 may be larger than both the lower tube diameter D2 and the upper tube diameter D1.

For example, the connector terminating end 34a of the lower tube 14 may be configured to be received within, and/or through, the lower opening 24b and the upper tube second terminating end 20b such that the exterior surface 32b near the connector terminating end 34a of the lower tube 14 slidably engages with the interior surface 18a of the upper tube 12 permitting the lower tube 14 to be positioned within the upper tube 12 at a predetermined position between the upper tube first terminating end 20a and the upper tube second terminating end 20b. As such, the connector terminating end 34a defines a lip 38 or ledge within the upper tube 12.

In the illustrated embodiments, the upper tube 12 and the lower tube 14 may be coaxially aligned in the vertical direction (i.e., in the +/−Z direction). In other embodiments, the upper tube 12 and the lower tube 14 may be aligned in the lateral direction (i.e., in the +/−Y direction), in the longitudinal direction (i.e., in the +/−X direction) combinations thereof, and/or the like.

Now referring to FIG. 2, a valve assembly 40 is positioned below or downwardly from the valve terminating end 34b in the vertical direction (i.e., in the +/−Z direction). The valve assembly 40 may include a housing 41 that houses a valve 42, a piping system 44, and an operation nut 46 that is operably connected to the valve 42 to control the valve 42 to permit or inhibit fluids from passing through the valve 42 within the piping system 44. In embodiments, the operation nut 46 is positioned to extend from the valve 42 in the vertical direction (i.e., in the +/−Z direction), through the valve tube opening 35b and the valve terminating end 34b into the lower tube bore 36. As such, access to the operation nut 46 is maintained by the arrangement of the upper tube 12 and the lower tube 14.

Referring back to FIGS. 1-2, and now also referring to FIGS. 3A-7, the valve box assembly 10 further includes a removable valve plug assembly 50. The removable valve plug assembly 50 includes a support member portion 52 and a plug portion 54. The support member portion 52 may an exterior surface 56a and an opposite interior surface 56b spaced apart from the exterior surface 56a to define a thickness T1. A plurality of support members 58 extend outward from a center portion 60 of the support member portion 52. Further, the center portion 60 may include an aperture 62 extending through the thickness T1 defined by the exterior surface 56a and the interior surface 56b.

Figure 4:
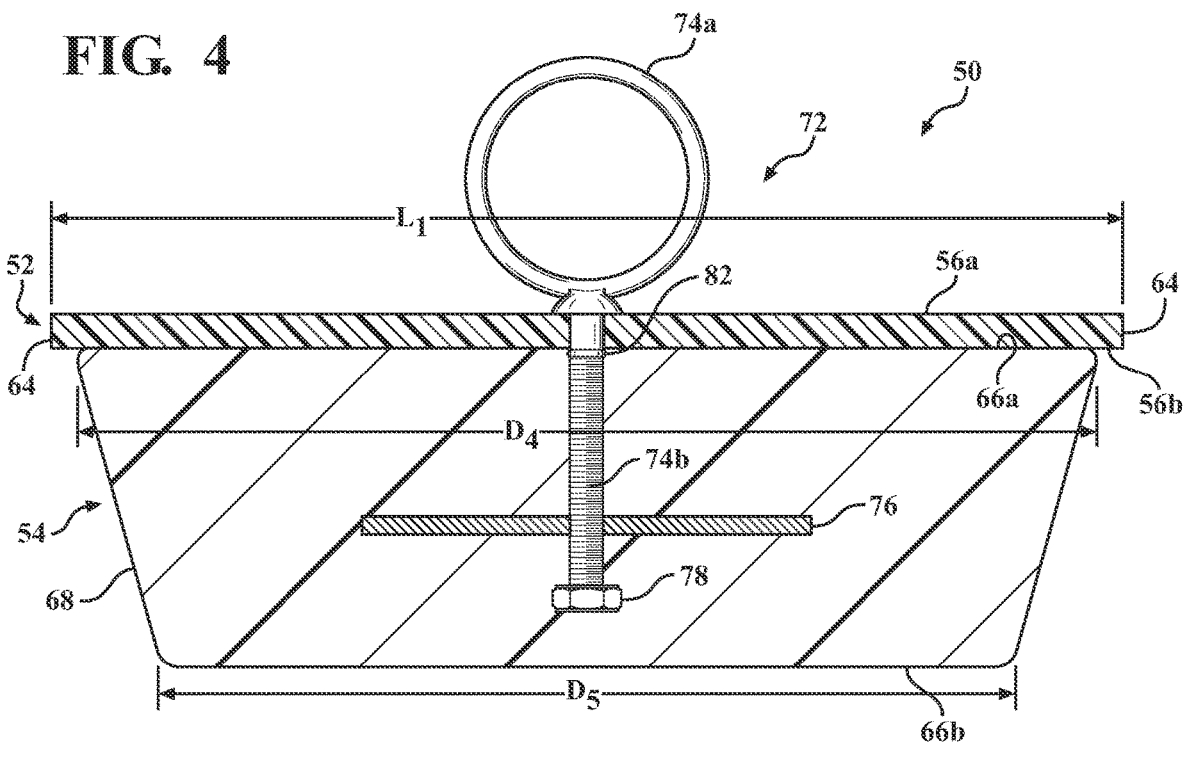
FIG. 4 schematically depicts an isolated cross-sectional view of the removable valve plug assembly of the example valve box assembly of FIG. 1 taken from line 2-2, according to one or more embodiments shown or described herein.
Figure 5:
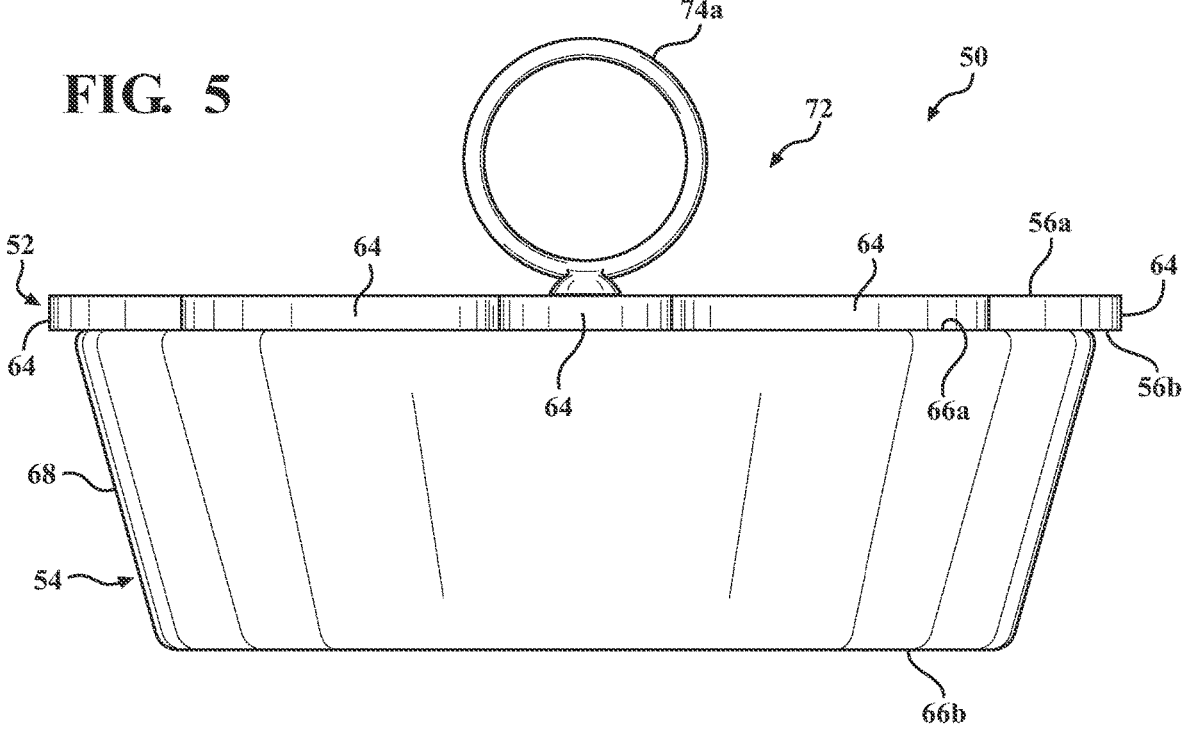
FIG. 5 schematically depicts an isolated side view of the removable valve plug assembly from the example valve box assembly of FIG. 1, according to one or more embodiments shown or described herein.
Figure 7:
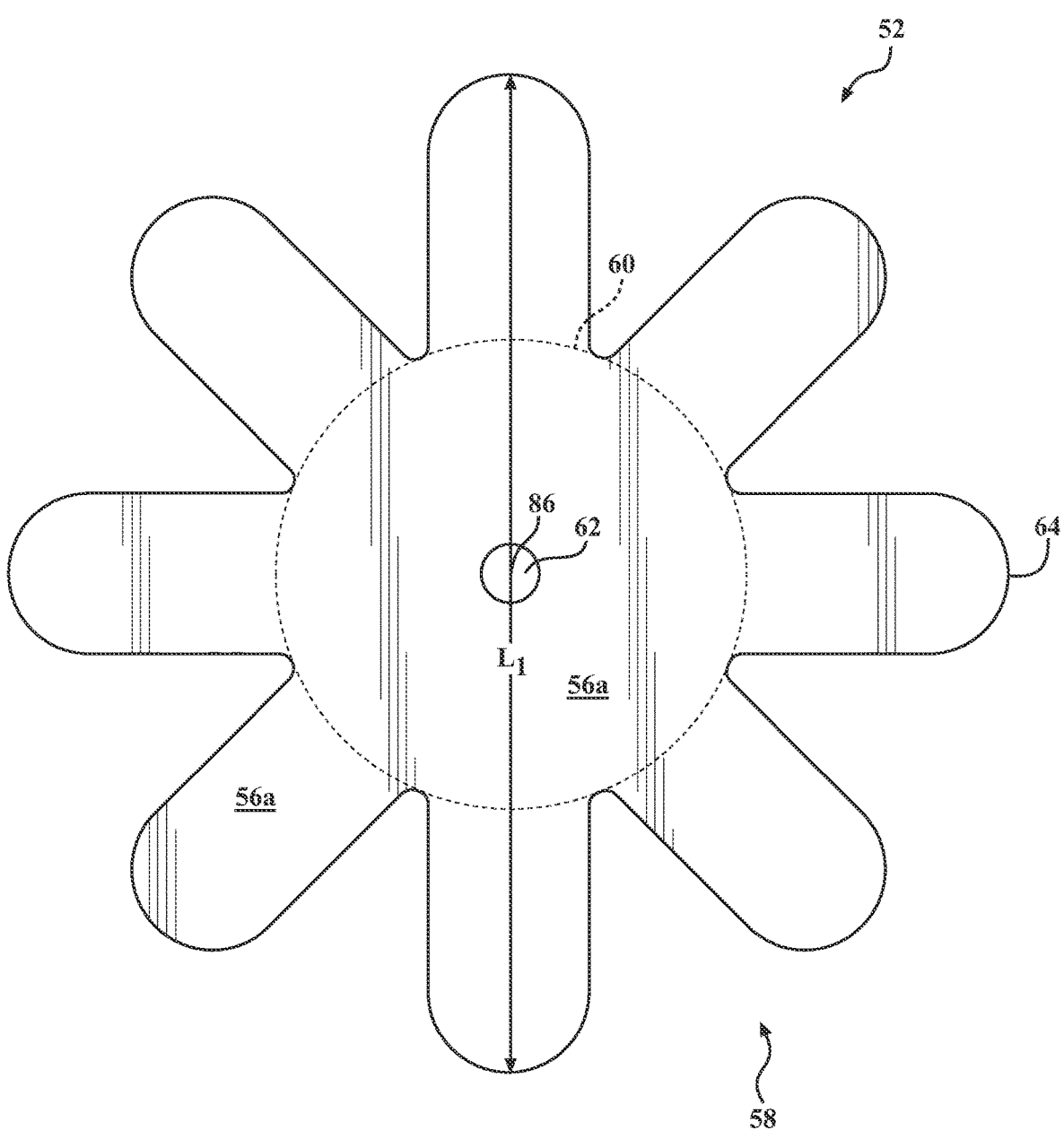
FIG. 7 schematically depicts an isolated top-down view of a support member portion of the removable valve plug assembly from FIG. 3A, according to one or more embodiments shown or described herein.

Each of the plurality of support members 58 include a terminating portion 64 opposite of the center portion 60. In some embodiments, the plurality of support members 58 may include eight spaced apart support members that arranged in a star configuration, as best illustrated in FIG. 7. This is non-limiting and the plurality of support members 58 may be in any shape or design, may be uniformly spaced apart or irregularly spaced apart, and the like. A total length L1 or distance of the support member portion 52 is best illustrated in FIG. 4.

Figure 6:
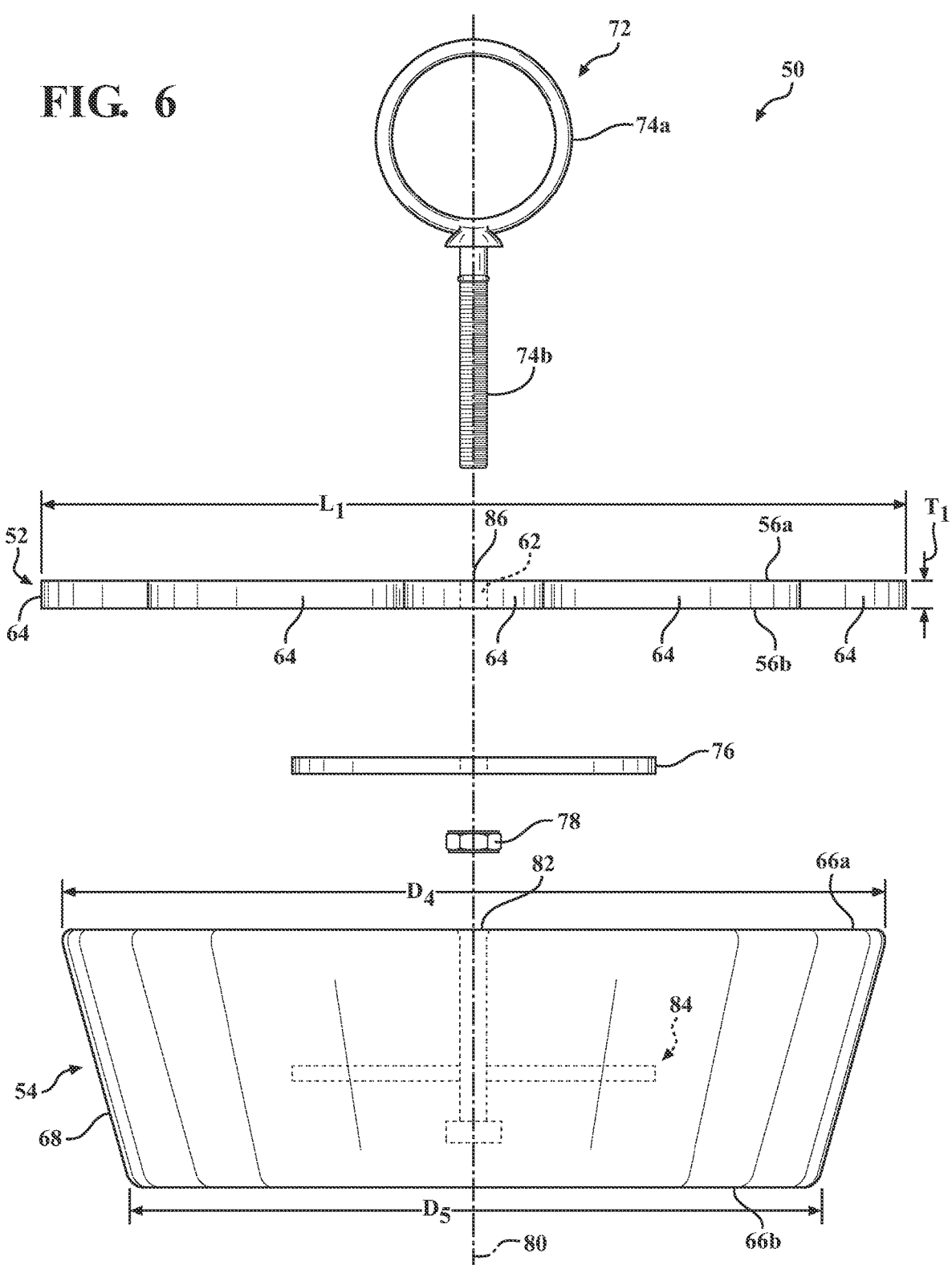
FIG. 6 schematically depicts an isolated exploded side view of the removable valve plug assembly from the example valve box assembly of FIG. 1, according to one or more embodiments shown or described herein.

The plug portion 54 may have a top surface 66a and an opposite bottom surface 66b spaced apart from one another by a continuous wall 68. The continuous wall 68 may slope in an inwardly central axis direction 80 from the top surface 66a to the bottom surface 66b. That is, the continuous wall 68 may be tapered in the vertical direction (i.e., in the +/−Z direction) between the top surface 66a to the bottom surface 66b such that the top surface 66a has a top diameter D4 that is larger or greater than a bottom diameter D of the bottom surface 66b. As such the top surface 66a may define an outermost perimeter of the plug portion 54. The top diameter D1 is smaller than the diameter of the upper tube 12 to allow the plug portion 54 to enter the upper tube bore 22 and engage with the lower tube 14, as discussed in greater detail herein. In some embodiments, the top surface 66a may further include a passage 82 that is configured to receive components of a handle assembly 72, as discussed in greater detail herein. Further, the plug portion 54 may include other voids 84 or passages, as best illustrated in FIG. 6, to receive other components of the handle assembly 72, as discussed in greater detail herein.

The continuous wall 68 may be configured to, or operable to, contact or slidably engage with a portion of the interior surface 32a of the continuous wall 30 of the lower tube 14 to inhibit the removable valve plug assembly 50 from advancing fully into the lower tube 14. That is, the continuous wall 68 may engage with a portion of the interior surface 32a of the continuous wall 30 of the lower tube 14 to frictionally secure the plug portion 54 to the interior surface 32a of the continuous wall 30 of the lower tube 14. In some embodiments, the continuous wall 68 may slidably engage with the interior surface 32a at, or adjacent to, the connector terminating end 34a of the lower tube 14, which is positioned within the upper tube 12. As such, a portion of the plug portion 54 may be positioned within the connector tube opening 35a of the lower tube 14 (e.g., portions of the continuous wall 68 and the bottom surface 66b) while other portions of the plug portion 54 remain in the upper tube 12 (e.g., the top surface 66a, the support member portion 52).

Further, the engagement between the continuous wall 68 and the interior surface 32a of the continuous wall 30 of the lower tube 14 form a seal between the interior surface 32a and the plug portion 54 to inhibit sand, dirt, debris, and the like, from passing through the lower tube bore 36 to the valve assembly 40.

The support member portion 52 may be coupled or otherwise attached to the plug portion 54 in such an arrangement that the interior surface 56b of the support member portion 52 abuts or otherwise is in communication with the top surface 66a of the plug portion 54. In some embodiments, the support member portion 52 may be coupled or otherwise attached to the plug portion 54 via a fastener 70, such as, without limitation, a screw, bolt, rivet, weld, and/or the like. In other embodiments, the support member portion 52 may be coupled or otherwise attached to the plug portion 54 via an epoxy, adhesive, and/or the like.

Each of the terminating portions 64 of the plurality of support members 58 may extend beyond the perimeter or top diameter D4 of the top surface 66a of the plug portion 54. That is, the total length L1, or distance, of the support member portion 52 is larger or longer than the top diameter D4 of the top surface 66a of the plug portion 54 such that portions of the plurality of support members 58 extend beyond the top surface 66a and the bottom surface 66b of the plug portion 54.

The terminating portion 64 of each of the plurality of support members 58 may be configured to slidably engage with the interior surface 18a of the upper tube 12 and may engage or abut with the lip 38 created by the connector terminating end 34a of the lower tube 14 positioned within the upper tube 12. Each of the plurality of support members 58 prohibit the plug portion 54 from advancing beyond the lip 38 in the vertical direction (i.e., in the +/−Z direction) towards the valve assembly 40. As such, regardless of weather, creep, degradation, and the like, that may cause the continuous wall 68 of the plug portion 54 to shrink or otherwise have a size that would permit the plug portion 54 to pass through the lower tube, the plurality of support members 58 maintain engagement with the lip 38 preventing the plug portion 54 from advancing towards the valve assembly 40.

In embodiments, the plug portion 54 is made from an elastomer such that appropriate chemical compatibility, temperature, sealing pressure, lubrication requirements, cost requirements and the like are met. For example, and without limitation, the plug portion 54 may be formed from silicone. In other examples, and without limitation, the plug portion 54 may be formed from natural rubbers, styrene-butadiene block copolymers, polyisoprene, polybutadiene, ethylene propylene rubber, ethylene propylene diene rubber, fluoroelastomers, polyurethane elastomers, and nitrile rubbers.

In embodiments, the support member portion 52 is made from a polymer such that appropriate chemical compatibility, temperature, cost requirements and the like are met. For example, and without limitation, the support member portion 52 may be formed from polyvinyl chloride (PVC). In other examples, and without limitation, the support member portion 52 may be formed from acrylic or polymethyl methacrylate (PMMA), polycarbonate (PC), polyethylene (PE), polypropylene (PP), polyethylene terephthalate (PETE or PET), acrylonitrile-butadiene-styrene (ABS), and the like.

In some embodiments, the removable valve plug assembly 50 may further include the handle assembly 72 which includes a grip portion 74a extending from the exterior surface 56a of the support member portion 52. In some embodiments, the grip portion 74a may be positioned to extend from a center point 86 of the center portion 60 such as where the aperture 62 is positioned. The handle assembly 72 may further include an attachment portion 74b position opposite of the grip portion 74*a*. The attachment portion 74*b* may be threaded and may be configured to engage with the aperture 62 and/or the passage 82. In some embodiments, the aperture 62 and/or the passage 82 may be threaded to compliment the threads of the attachment portion 74*b* such that the attachment portion 74*b* may be rotated to thread into the aperture 62 and/or the passage 82 to secure the handle assembly 72 to the plug portion 54. In other embodiments, the plug portion 54 includes a washer 76 and a nut 78 embedded within the other voids 84 of the continuous wall 68 and are each configured to receive the attachment portion 74*b* of the handle assembly 72 to secure the grip portion 74*a* to the plug portion 54. In other embodiments, an epoxy, adhesive, weld, and/or other types of fastener may be used to secure the grip portion 74*a* to the plug portion 54.

In some embodiments, the grip portion 74*a* and/or other components of the handle assembly 72 may be formed from a rigid material. For example, and without limitation, metals, alloys, polymer, and the like. In other embodiments, the grip portion 74*a* may be formed of a flexible material, such as a nylon, hook and loop, elastomer, and the like.

Figure 8:
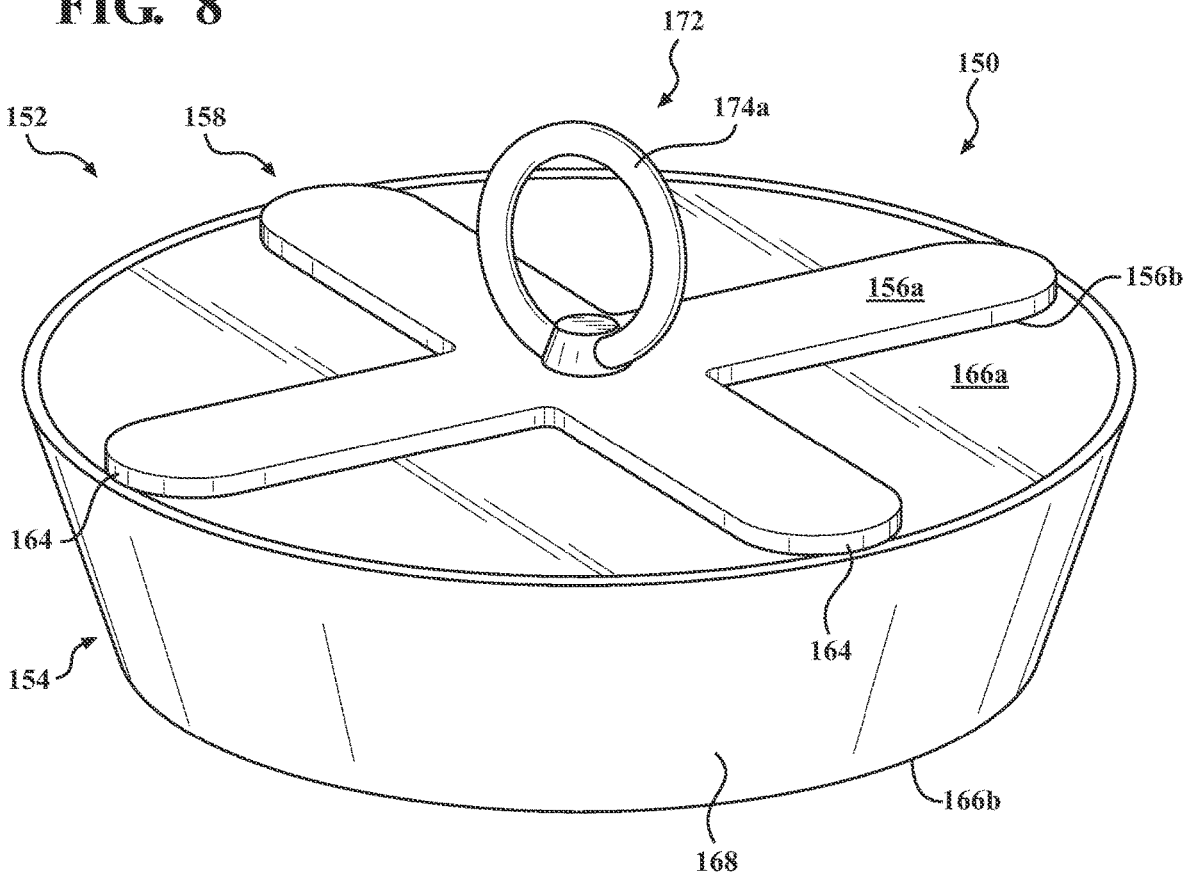
FIG. 8 schematically depicts an isolated perspective view of a second aspect of the removable valve plug assembly from the example valve box assembly of FIG. 1, according to one or more embodiments shown or described herein.

Now referring to FIG. 8, a second aspect of a removable valve plug assembly 150 is schematically depicted. It is understood that the removable valve plug assembly 150 is similar to the removable valve plug assembly 50 with the exceptions of the features described herein. As such, like features will use the same reference numerals with a prefix "1" for the reference numbers. As such, for brevity reasons, these features will not be described again.

The support member portion 152 of the removable valve plug assembly 150 includes the plurality of support members 158. However, in this illustrated aspect, the plurality of support members 158 includes four support members arranged in a cross shape. This is non-limiting and the plurality of support members 158 may be in any shape or design, may be uniformly spaced apart or irregularly spaced apart, and the like. The total length L1 of the support member portion 152 remains larger or greater than the top diameter D5 of the top surface 166*a* of the plug portion 154 such that the terminating ends 164 of each of the plurality of support members 158 extends beyond the top surface 166*a* pf the continuous wall 168.

Is should be understood that the embodiments described herein are directed to a removable valve plug assembly for use within a valve box assembly to prevent sand, dirt, and other debris from entering an undesirable section or portion of the valve box assembly, such as from entering the lower tube that is protecting access to the operation nut. Sand, dirt, and other debris inhibits the ability of a valve operably connected to the operation nut to be operated properly, in a desirable manner, and in some cases, may prevent quick access to the operation nut and/or valve for immediate turn-off. The removable valve plug assembly described herein uses gravity and friction to generate a seal and is configured to prevent the plug from advancing beyond the connection between the upper tube and the lower tube regardless of the degradation that may damage the plug portion, which would normally result in the plug falling on top of the operation nut.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A removable plug assembly configured to inhibit debris from passing through a tube, the removable plug assembly comprising;

a support member portion having at least four spaced apart support members extending outward from a center portion and each having an apex; and a plug portion having an upper wall and an opposite lower wall, the upper wall having a top surface defining a perimeter, the perimeter being a rounded border, a continuous wall sloping in an inwardly central axis direction from the rounded border to a bottom surface of the lower wall, the support member portion coupled to the top surface, each apex of the plurality of support members extends beyond the perimeter, a portion of the continuous wall is operable to contact a portion of an inner surface of the tube to inhibit the plug portion from advancing fully into the tube, wherein the rounded border has a radius of curvature from the upper wall to the continuous wall.

2. The removable plug assembly of claim 1, wherein the portion of the continuous wall of the plug portion is operable to frictionally secure the plug portion to the inner surface of the tube between the top surface and the bottom surface.

3. The removable plug assembly of claim 1, wherein at least four spaced apart support members extending outward from the center portion are eight spaced apart support members arranged in a star configuration.

4. A valve box assembly comprising:

a first tube having an inner diameter;

a second tube having a terminating end portion that is received within the inner diameter of the first tube to create a lip within the first tube;

a valve assembly positioned below the second tube in a vertical direction, and a removable plug comprising:

a support member portion having a plurality of support members extending outward from a center portion; and a plug portion having an upper wall and an opposite lower wall, the upper wall having a top surface defining a perimeter, the perimeter being a rounded border, a continuous wall tapered in an inwardly central axis direction from the rounded border to a bottom surface of the lower wall, the support member portion coupled to the top surface, each one of the plurality of support members extends beyond the perimeter, the continuous wall is operable to contact a portion of an inner surface of the second tube to inhibit the removable plug from advancing fully into the second tube, wherein the plug portion is operable to frictionally secure the plug portion to the second tube between the top surface and the bottom surface.

5. The valve box assembly of claim 4, further comprising:

an operational nut positioned within the second tube and coupled to the valve assembly, wherein the plug portion is configured to inhibit debris from passing beyond the top surface of the removable plug to the operational nut within the valve box assembly.

6. The valve box assembly of claim 4, wherein the second tube has a second inner diameter smaller than the inner diameter of the first tube.

7. The valve box assembly of claim 6, wherein each of the plurality of support members extends outward a distance greater than the second inner diameter of the second tube.

8. The valve box assembly of claim 4, further comprising:
a handle extending from the center portion of the support member portion.

9. The valve box assembly of claim 4, wherein the plurality of support members extending outward from the center portion are eight spaced apart support members arranged in a star configuration.

10. The valve box assembly of claim 9, wherein the support member portion is formed of a first material, the plug portion is formed of a second material, the first material is different from the second material.

11. A valve box assembly having a first tube and a second tube, a terminating end portion of the second tube received within an inner diameter of the first tube to create a lip within the first tube, a valve assembly positioned below the second tube in a vertical direction, an operational nut positioned within the second tube and coupled to the valve assembly, the valve box assembly comprising:
a removable plug including:
a support member portion having a plurality of support members extending outward from a center portion; and
a plug portion having an upper wall and an opposite lower wall, the upper wall having a top surface defining a perimeter, the perimeter being a rounded border, a continuous wall sloping in an inwardly central axis direction from the rounded border to a bottom surface of the lower wall, the support member portion coupled to the top surface, each one of the plurality of support members extends beyond the perimeter, the continuous wall is operable to contact a portion of an inner surface of the second tube to inhibit the removable plug from advancing fully into the second tube.

12. The valve box assembly of claim 11, wherein the continuous wall of the plug portion is tapered between the rounded border and the bottom surface.

13. The valve box assembly of claim 11, wherein the continuous wall of the plug portion is operable to frictionally secure the plug portion to the second tube between the top surface and the bottom surface.

14. The valve box assembly of claim 13, wherein the plug portion is frictionally secured to the second tube at a position above the operational nut in the vertical direction.

15. The valve box assembly of claim 14, wherein the plug portion is configured to inhibit debris from passing beyond the top surface of the removable plug to the operational nut within the valve box assembly.

16. The valve box assembly of claim 11, wherein the second tube has a second inner diameter smaller than the inner diameter of the first tube.

17. The valve box assembly of claim 16, wherein each of the plurality of support members extends outward a distance greater than the second inner diameter of the second tube.

18. The valve box assembly of claim 11, further comprising:
a handle extending from the center portion of the support member portion.

19. The valve box assembly of claim 11, wherein the plurality of support members extending outward from the center portion are eight spaced apart support members arranged in a star configuration.

20. The valve box assembly of claim 19, wherein the support member portion is formed of a first material, the plug portion is formed of a second material, the first material is different from the second material.

\* \* \* \* \*